United States Patent [19]
Plapp

[11] Patent Number: 4,718,272
[45] Date of Patent: Jan. 12, 1988

[54] ADAPTATION METHOD FOR A POSITION DETECTION MEMBER, PARTICULARLY IN A MOTOR VEHICLE

[75] Inventor: Günther Plapp, Filderstadt, Fed. Rep. of Germany

[73] Assignee: Robert Bosch GmbH, Stuttgart, Fed. Rep. of Germany

[21] Appl. No.: 905,381
[22] PCT Filed: Oct. 5, 1985
[86] PCT No.: PCT/DE85/00366
§ 371 Date: Jul. 2, 1986
§ 102(e) Date: Jul. 2, 1987
[87] PCT Pub. No.: WO86/03258
PCT Pub. Date: Jun. 5, 1986

[30] Foreign Application Priority Data

Nov. 19, 1984 [DE] Fed. Rep. of Germany ....... 3442212

[51] Int. Cl.$^4$ ............................................. G01M 15/00
[52] U.S. Cl. ................................. 73/118.1; 364/431.05
[58] Field of Search .................... 73/117.3, 116, 118.1; 123/494; 364/431.05

[56] References Cited
U.S. PATENT DOCUMENTS 4,526,042 7/1985 Yamazoe et al. ............... 73/118.1 X
4,586,403 5/1986 Lee et al. ........................ 73/118.1 X

FOREIGN PATENT DOCUMENTS 7120684 5/1971 Fed. Rep. of Germany .
2442373 3/1976 Fed. Rep. of Germany .
1506440 4/1978 United Kingdom .

Primary Examiner—Jerry W. Myracle
Attorney, Agent, or Firm—Michael J. Striker

[57] ABSTRACT

An adaptation method for a position detection member, particularly for detection of the position of the throttle valve of an internal combustion engine in a motor vehicle, is suggested, wherein a plurality of position receivers have a common drive and scan a plurality of overlapping path areas with different resolutions. The adaptation is effected in the overlapping path areas. In so doing, a correction value ($k_i$) is formed, and the measured values (M2) of the path area to be adapted is added to it. A new correction value ($K_{i+1}$) is formed in each instance from the differential value (D) between the corrected measured value (W2) of the path area to be adapted and a desired value (T (W1)) for this path area. In so doing, the desired value is taken from an assignment table by means of which measured values (W1) of another path area forming a measurement basis are assigned desired values for the path area to be adapted. A very high accuracy can be achieved by means of this adaptation in spite of low-cost manufacture with relatively high allowable tolerances of the position detection member.

4 Claims, 9 Drawing Figures b)

c)

d)

ADAPTATION METHOD FOR A POSITION DETECTION MEMBER, PARTICULARLY IN A MOTOR VEHICLE

PRIOR ART

The invention is based on an adaptation method for a position detection member, particularly for the detection of positions of a movable control part in a motor vehicle, of the type which includes a plurality of position receivers which scan a plurality of overlapping path areas with different resolutions. Potentiometers, which likewise comprise overlapping potentiometer paths with different resolutions, are known from the German Utility Model No. 71 20 684, as well as from DE-OS No. 34 33 585, for use as throttle valve position indicators. It is possible with this arrangement to work in the region of small opening angles with a very high resolution and in the region of larger opening angles with a smaller resolution.

An electrically controlled, intermittently working fuel injection system with an injection signal generation which is based on the speed of rotation and the throttle valve position is known from DE-OS No. 24 42 373. The throttle valve position is detected by means of a potentiometer. In regard to an optimal fuel apportioning, it is necessary to detect the throttle valve position very accurately in the region of relatively small throttle valve opening angles, i.e. in the lower load region. This requires an increased resolution in the lower load region in comparison to higher load regions.

When using a potentiometer with overlapping path regions, wherein the path region corresponding to the small opening angles has a higher resolution, a sufficient accuracy for detecting, e.g., the throttle valve position can be achieved in principle, but it has proven very difficult to assign the overlapping path regions to one another accurately enough so that an allowed error of 0.2° is not exceeded. For reasons relating to manufacturing, particularly in mass production, however, no greater accuracy than ±1° can be achieved with justifiable expenditure.

OBJECT AND ADVANTAGES OF THE INVENTION

Therefore, it is the object of the invention to show a method by means of which a very accurate assignment of the measurment signals of the various path regions to one another can be achieved, and too high manufacturing tolerances are avoided.

This object is met in an advantageous manner in that adaptation is effected in the overlapping path areas, wherein a correction value ($K_i$) is formed and the measured values (M2) of the path area to be adapted are added to it, and in that a new correction value ($K_{i+1}$) is formed in each instance from the difference value (D) between the corrected measured values (W2) of the path area to be adapted and a desired value (T(W1)) for the path area, which desired value (T(W1)) is given by means of a stored assignment table of measured values (W1) of another path area forming a measurement basis. Subsequent displacements, e.g. due to aging, can also still be compensated and do not lead to errors in the measuring results. In comparison to the manufacturing tolerances, a very high accuracy and resolution are achieved.

Advantageous further developments and improvements of the adaptation method are possible by means of the features given in the subclaims. Thus, it is guaranteed, in particular, that temporarily occurring interference signals or displacements due to shaking have no influence on the correction value for the adaptation, since a new correction value is only formed, after a predetermined quantity of operating cycles, if the deviation always has the same direction.

BRIEF DESCRIPTION OF THE DRAWING

Embodiment examples of the invention are shown in the drawing and are described and explained in more detail in the following.

DESCRIPTION OF THE EMBODIMENT EXAMPLES

Figure 1:
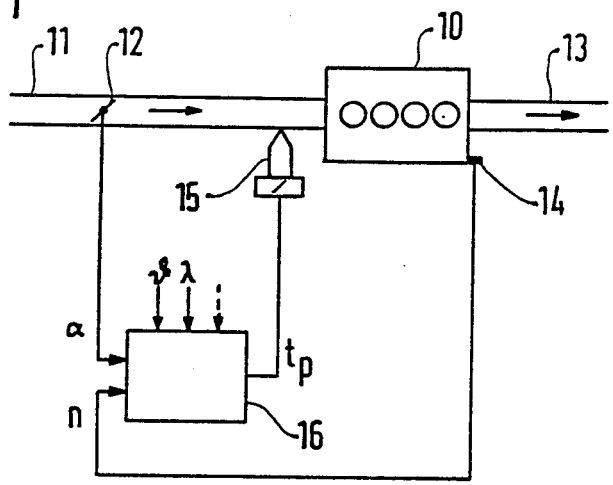
FIG. 1 shows a schematic illustration of an electronically controlled injection system in which the throttle valve position and the speed of rotation are processed as the most important operating characteristic values.

FIG. 1 discloses the basic structure of an electrically controlled and preferably intermittently working fuel injection system proceeding from signals of the speed of rotation and of the throttle valve position angle. Such an arrangement is known, e.g. from DE-OS No. 24 42 373, already mentioned in the beginning.

An internal combustion engine 10 obtains intake air via an intake tube 11 with a throttle valve 12 and has an exhaust gas line 13. A rotational speed sensor 14 detects the instantaneous rotational speed of the crankshaft and, together with the position α of the throttle valve 12, determines an injection signal tp for an injection valve 15 assigned to the intake tube 11. As a rule, additional operating characteristic values, such as, e.g. the temperature and lambda, are input into the control device 16 for the electronic injection, in addition to rotational speed and throttle valve position. This is indicated with additional inputs of the control device 16.

In accordance to the load region of the internal combustion engine the throttle valve 12 has a different opening angle. The reaction of the internal combustion engine in the region of smaller opening angles of the throttle valve is more sensitive than in large opening angles, so that it is necessary to select the resolution of the opening angle in the lower load region so as to be higher than in the upper load region.

Figure 2:
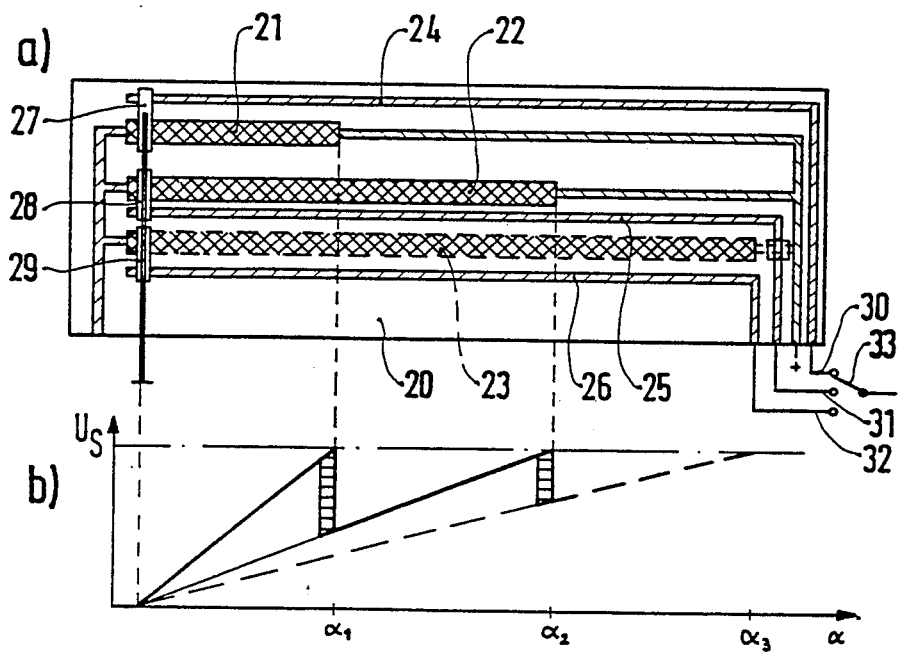
FIG. 2 shows a position detection member with a plurality of individual paths and individual regions, respectively, proceeding from a common starting point.

FIG. 2 shows an example for a position detection member for the throttle valve 12 in the subject matter of FIG. 1 in a linear, and accordingly clearer, drawing.

According to FIG. 2a, three resistor paths 21, 22 and 23 with three assigned slider paths 24, 25 and 26, as well as three sliders 27, 28 and 29, which are coupled with a common drive, not shown, are located on a common substrate 20. The three resistor paths form three potentiometers whose output signals can be taken off via the conductor paths 24 to 26 at lines 30 to 32, and the individual signals can be selected by means of a switch 33 for further processing.

It is essential that the overall applied voltage decreases over the individual path regions of the resistor paths 21 to 23 so that the signal is shown from FIG. 2b results over the entire path region. Since the individual resistor paths 21 to 23 are constructed with linear resistance behavior, straight lines with various slopes proceeding from a point corresponding to the left common stop result according to FIG. 2b.

Three resistor paths are drawn in FIG. 2a; however, the invention can be generalized by means of a plurality of individual paths, two in the simplest instance.

When a resistor path reaches its right-hand end point or the proximity of the latter, then this is detected by means of electrical means, and the switch 33 is correspondingly switched forward. The signal course, shown in a solid line in FIG. 2b, which reflects different resolutions in individual path regions, accordingly results.

Figure 3:
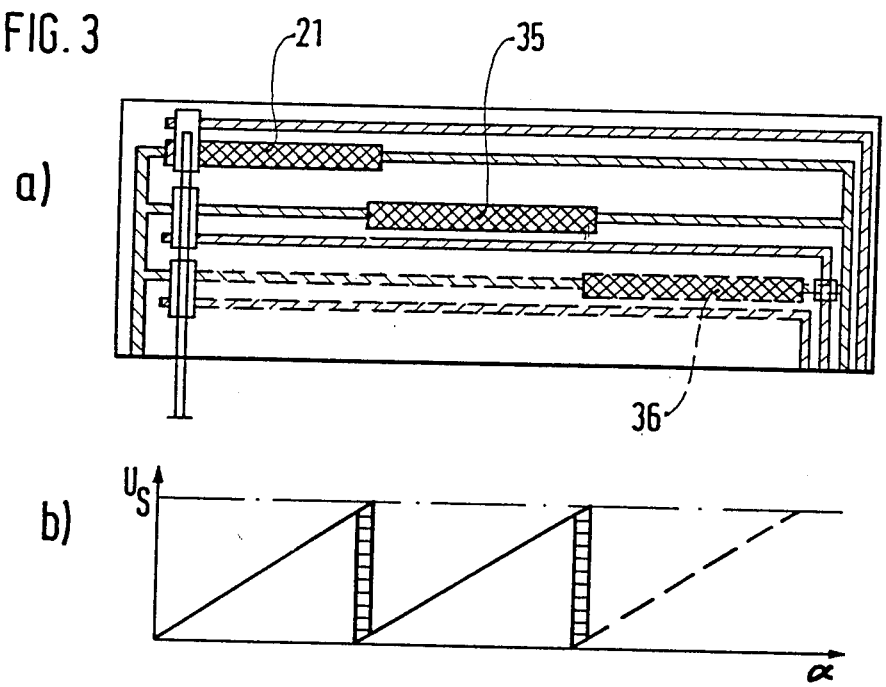
FIG. 3 shows another example of a position detection member with individual regions which are arranged so as to be distributed over the entire region.

FIG. 3 shows a change of the embodiment of FIG. 2 to the effect that the individual resistor paths do not begin in the same drive position, but, rather, are arranged so as to be offset relative to one another. Thus, in the example according to FIG. 3, the second resistor path 35 begins at the end or in a determined overlapping area with the resistor path 21 and another resistor path 36, which is possibly present, then begins precisely where the preceding resistor path 35 ends. According to the drawing according to FIG. 3b, this means a sawtooth-shaped signal behavior of the overall arrangement with very high resolution in all regions. Changes with respect to the subject matter of FIGS. 2 and 3 are naturally possible to the effect that determined functions are assigned to the individual resistor paths. Only a different operating area for the individual sliders, which connect the respective resistor path 21 to 23 with the conductor paths 24 and 26, is substantial, wherein these sliders can also sweep over the lengthening of the resistor path 21 and 22 or 35 without influencing the signal.

Figure 4:
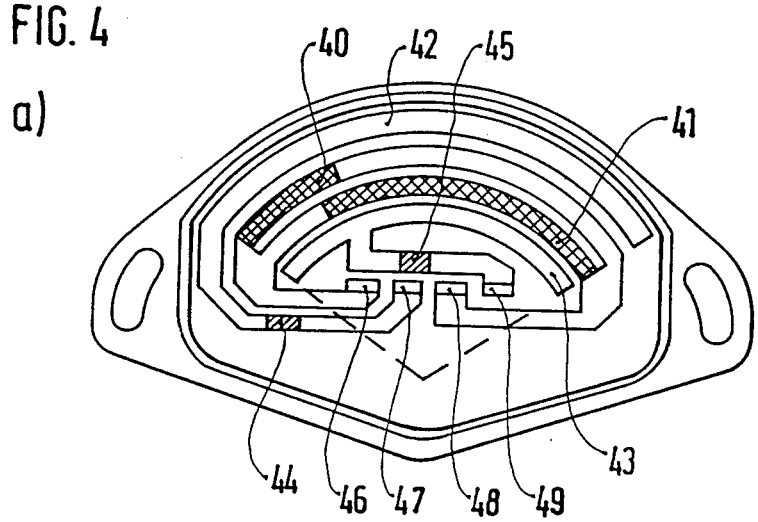
FIG. 4 (including parts 4a–4d) shows a position detection member for a rotational movement with two individual, offset path regions.
Figure 4:
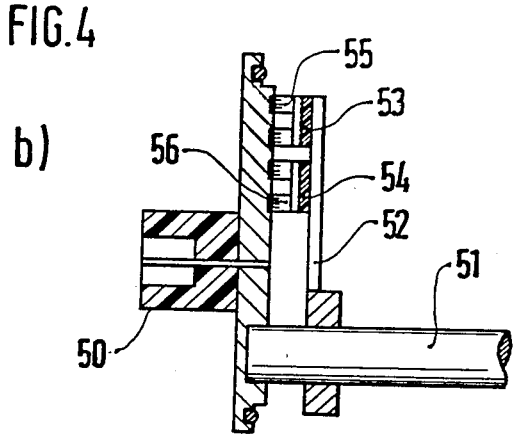
Figure 4:
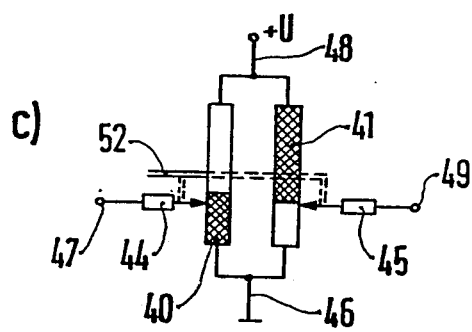
Figure 4:
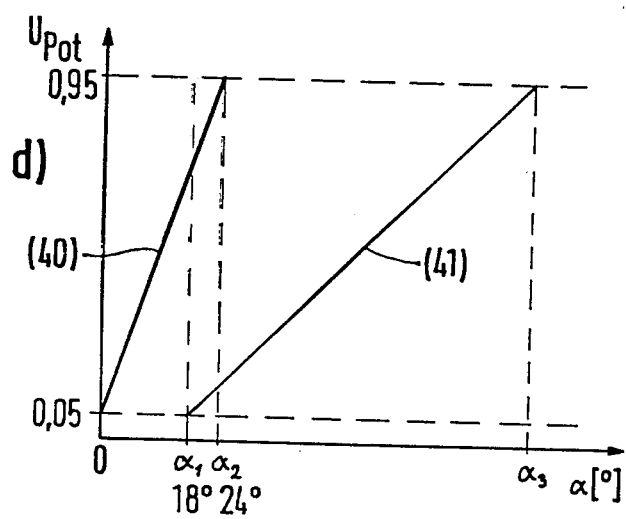

FIG. 4 shows a concrete embodiment example of a so-called throttle valve potentiometer corresponding to the principle of FIG. 3, i.e., that the individual resistor paths are arranged so as to be offset relative to one another.

In the throttle valve potentiometer, according to FIG. 4a, there are two resistor paths 40 and 41 which are arranged so as to be offset relative to one another within a determined deflection angle of a drive 51. The remaining areas of the resistor paths, i.e. their complement to the full deflection angle, are silver-coated underneath. A signal taken off them is therefore independent of the position. The slider paths assigned to the two resistor paths 40 and 41 are designated by 42 and 43. They are connected with the total of four connection points 46 to 49 via a resistor 44 and 45, in each instance, and are guided outward to a four-pole plug 50 because of the encapsulated construction of the throttle valve potentiometer. This four-pole plug 50 can be seen from the sectional drawing in FIG. 4b. Also shown in the latter are a throttle valve shaft 51 and a regulating lever 52, which is securely connected with the throttle valve shaft and to which the individual sliders 55 and 56 are connected, in turn, via an insulating plate 53 and 54, in each instance, the sliders 55 and 56 connecting the resistor path 40 with the slider path 42 and the resistor path 41 with the slider path 43.

FIG. 4c shows the corresponding electric equivalent circuit of the arrangement of FIG. 4a with the same respective reference numerals. It consists substantially of two potentiometer paths, connected in parallel, with resistor areas, which are arranged so as to be offset relative to one another, and a common drive 52.

The electric signal behavior of the subject matter of FIG. 4a is shown by FIG. 4d. Accordingly, the first resistor path 40 works in the angle range $0 \leq \alpha \leq \alpha_2$ and the second resistor path 41 in the range $\alpha_1 \leq \alpha \leq \alpha_3$. Since the two resistor paths 40 and 41 have a different length, there result different slopes, and accordingly different voltage gradients, over an angular increment in each angle range. To this extent, there is a mixed form of examples according to FIGS. 2 and 3 in the embodiment example of FIG. 4, since the subject matter of FIG. 4 is based on different initial values, but, at the same time, different slopes are realized.

The area of application of the position detection member, according to the invention, is not limited to the detection of the throttle valve position, it can be used anywhere where a position measurement is to be effected over the entire value range with different resolutions and individual potentiometers, which work substantially linearly, are referred to.

Figure 5:
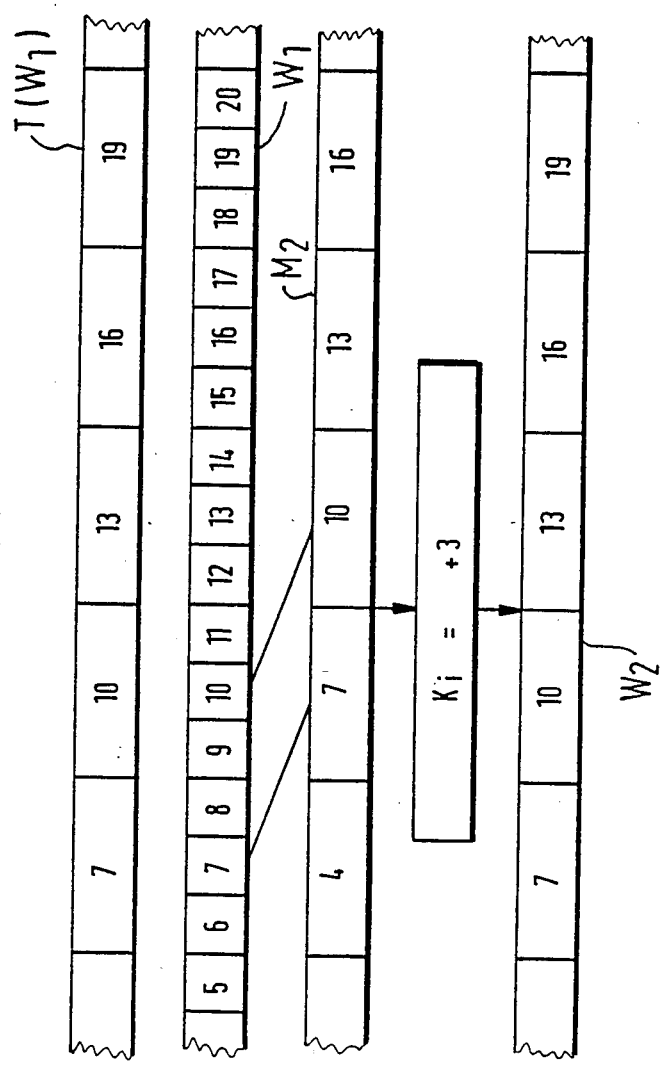
FIG. 5 shows a drawing of the assignment of the measured values of two overlapping resistor paths.

In FIG. 5, the assignment of the measured values of two overlapping resistor paths, shown in FIG. 4d as courses potentials, are explained in digital measured values. In control device 16, constructed as a microcomputer, the measured values, which are fed as analog voltages, are customarily converted into digital values via analog-digital converters in the input circuit (not shown in more detail) W1 designates the measured values of a high-resolution first resistor path, for example, resistor path 40. M2 designates the measured values of a second, less high-resolution resistor path, for example, resistor path 41, which overlaps with the first resistor path in a transition area. According to FIG. 4d, this is the area between $\alpha 1$ and $\alpha 2$. The first resistor path has a three-times higher resolution in comparison with the second resistor path. A table T (W1), which contains a standard assignment or correlation of the values of the two resistor paths, is stored in a memory of the microcomputer in the control device 16. It can be seen in FIG. 5 that the measured values M2 diverge from this standard assignment by the value of 3, i.e. the two resistor paths are incorrectly offset relative to one another by an angle corresponding to value 3, for example, as a consequence of manufacturing tolerances or aging. A correction value $K_i$ corresponding to this value 3 is now formed in the computer, which correction value $K_i$ is added to the measured values M2. There result, accordingly, corrected values W2 which correspond to the table values T (W1) and which are passed on for processing in the computer, e.g. in order to calculate the injection time.

Figure 6:
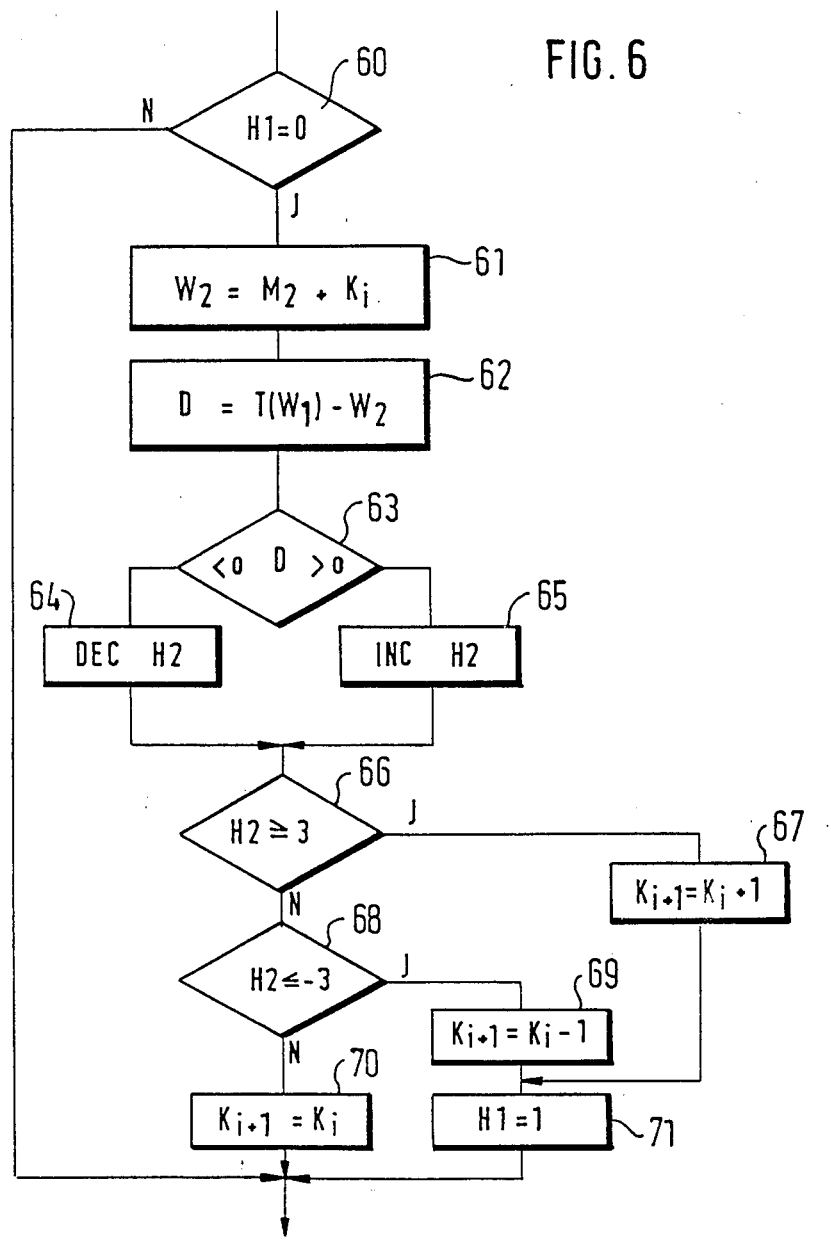
FIG. 6 shows a flowchart to explain the manner of operation of the adaptation.

The formation of these correction values $K_i$ is explained in more detail in the flowchart shown in FIG. 6. In this adaptation method, the state of a memory cell or register H1 is first interrogated (step 60). This memory cell H1 is set to the value zero for the purpose of initialization during the switching on of the supply voltage and fulfils a flag function. In order to form a corrected value W2 for the second resistor path, the measured value M2 of this resistor path is added to the correction value $K_i$ in step 61, insofar as there is a correction value at all, of course, since a value of zero is given first. This was already explained in FIG. 5. Then, in step 61, it is interrogated whether the corrected value W2 corresponds to the table value T (W1). If this is not the case, a difference value D is formed by means of subtraction. These processes naturally refer to the overlapping area of the two resistor paths; that is to the area between α1 and α2, according to FIG. 4d.

It is now checked in step 63 whether a possibly present difference value D is greater or less than zero. If the difference value is less than zero a register H2 is decremented (step 64), if it is greater than zero the register H2 is incremented (step 65). The sense of this step is to avoid a change of the correction value already at the moment when a single deviation or a single difference value occurs. This could be caused by an interfering signal or shaking. Only when a predetermined quantity of deviations in the same direction is established is one to assume a permanent deviation which requires a correction.

The number of the required deviations is fixed at 3 in the embodiment example. Therefore, it is first checked in step 66 whether the register content is H2≧3. If this is the case, the correction value $K_i$ is increased by an increment, and a new correction value $K_{i+1}$ results (step 67). If, on the other hand, the register content is H2≦−3 (step 68), then the correction value K; is decremented by the value 1 (step 69). However, if neither of the two conditions 66, 68 is met, the previous correction value $K_i$ is retained (step 70).

If the correction value was changed through steps 67 or 69 the memory cell H1 is then set to the value 1 (step 71). The reason for this is that the condition H1=0 in step 60 is no longer met in a renewed program passthrough and, accordingly, no further change of the correction value can be effected. The adaptation cycle is only run through anew in the next operating cycle, that is when, e.g., the supply voltage is switched off and subsequently switched on again.

Of course, in a simpler version, the correction value $K_i$ can also be correspondingly corrected during each occurrence of a difference value D. Likewise, the adaptation can also be effected in principle during each program passage.

Instead of path areas which are constructed as slider paths other sensing systems can also be used in principle for the purpose of position detection, such as, e.g., inductive, capacitive or optical methods.

I claim:

1. Adaptation method for a position detection member, particularly for the detection of positions of a movable control part in a motor vehicle, of the type having a common drive for a plurality of position receivers which scan a plurality of overlapping path areas with different resolutions, comprising the steps of measuring values (W1) in one of said path areas, ascertaining, in the overlapping region of said one path area with another path area to be adapted a correction values ($K_i$); forming on a basis of the measured values (W1) in said one path area an assignment table T (W1) indicative of desired values of said other path area; adding the ascertained correction value ($K_i$) to values (M2) measured in said other path area thus forming corrected values (W2) for said other path area; determining a difference value (D) between the corrected values (W2) and the desired values T (W1) and forming in each operating cycle a new correction value ($K_{i+1}$) depending on the difference value (D).

2. Adaptation method according to claim 1, wherein the change of said correction value ($K_i$) is only effected if, in a predetermined quantity of operating cycles, said difference value (D) has the like sign in each instance.

3. Adaptation method according to claim 2, characterized in that said correction value ($K_i$) is changed in each instance by the value 1.

4. Adaptation method according to claim 3 wherein a register in a microcomputer is incremented or decremented in dependence on the algebraic sign of said difference value (D) in each said operating cycle, and wherein an incrementing or decrementing of said correction value is effected when the predetermined values are exceeded or not reached.

* * * * *